(12) United States Patent
Keith, Jr.

(10) Patent No.: US 8,234,238 B2
(45) Date of Patent: Jul. 31, 2012

(54) COMPUTER HARDWARE AND SOFTWARE DIAGNOSTIC AND REPORT SYSTEM

(75) Inventor: Robert O. Keith, Jr., Modesto, CA (US)

(73) Assignee: Maxsp Corporation, Sunnyvale, CA (US)

(*) Notice: Subject to any disclaimer, the term of this patent is extended or adjusted under 35 U.S.C. 154(b) by 157 days.

(21) Appl. No.: 11/440,563

(22) Filed: May 24, 2006

(65) Prior Publication Data

US 2007/0233633 A1     Oct. 4, 2007

Related U.S. Application Data

(63) Continuation-in-part of application No. 11/368,214, filed on Mar. 2, 2006, now Pat. No. 7,512,584.

(60) Provisional application No. 60/658,970, filed on Mar. 4, 2005.

(51) Int. Cl.
*G06N 5/04*     (2006.01)

(52) U.S. Cl. .................................... 706/60

(58) Field of Classification Search .................. 706/60
See application file for complete search history.

(56) References Cited

U.S. PATENT DOCUMENTS

| | | | |
|---|---|---|---|
| 4,866,635 A * | 9/1989 | Kahn et al. .................... 706/46 |
| 5,602,990 A * | 2/1997 | Leete ............................ 714/46 |
| 5,649,196 A | 7/1997 | Woodhill et al. ............ 395/620 |
| 5,659,743 A | 8/1997 | Adams et al. ................ 395/621 |
| 5,787,409 A * | 7/1998 | Seiffert et al. ................. 706/45 |
| 5,802,364 A | 9/1998 | Senator et al. |
| 5,812,751 A | 9/1998 | Ekrot et al. |
| 5,835,911 A | 11/1998 | Nakagawa et al. |
| 5,897,635 A | 4/1999 | Torres et al. |
| 5,933,647 A | 8/1999 | Aronberg et al. |
| 5,950,010 A | 9/1999 | Hesse et al. |
| 5,974,547 A | 10/1999 | Klimenko ........................ 713/2 |
| 6,012,152 A * | 1/2000 | Douik et al. .................... 714/26 |
| 6,029,196 A | 2/2000 | Lenz .............................. 709/221 |
| 6,067,582 A | 5/2000 | Smith et al. |
| 6,144,959 A | 11/2000 | Anderson et al. |
| 6,170,065 B1 * | 1/2001 | Kobata et al. ..................... 714/7 |
| 6,189,101 B1 | 2/2001 | Dusenbury, Jr. |
| 6,209,089 B1 | 3/2001 | Selitrennikoff et al. .......... 713/2 |
| 6,212,660 B1 | 4/2001 | Joeressen et al. ............ 714/758 |
| 6,282,711 B1 | 8/2001 | Halpern et al. |

(Continued)

OTHER PUBLICATIONS

"IEEE 100 The Authoritative Dictionary of IEEE Standards Terms (7th Edition 2000), 3 pages."*

(Continued)

*Primary Examiner* — Jeffrey A Gaffin
*Assistant Examiner* — Mai T Tran
(74) *Attorney, Agent, or Firm* — Haverstock & Owens LLP (57) ABSTRACT

The present invention tests computer systems for defects that are able to cause performance and functional problems. An agent application is first installed on a user's system. The agent application then retrieves problem data from the expert system library pertinent to the user's operating environment. The agent application tests the user's system for each problem description within a downloaded data structure from the expert system library. If a problem is discovered, a script attempts to remediate the problem and/or notifies the user, describing the issue. If an unknown problem arises, a feedback mechanism expands the expert system library by sending a notification that a problem was discovered. The feedback is then utilized to increase the total knowledge in the expert system library. Then when another user with a similar or the same setup is tested, the agent application will recognize the issue and will take the appropriate remedial actions.

32 Claims, 6 Drawing Sheets

U.S. PATENT DOCUMENTS

| | | | |
|---|---|---|---|
| 6,292,827 B1 | 9/2001 | Raz | 709/217 |
| 6,301,612 B1 | 10/2001 | Selitrennikoff et al. | 709/220 |
| 6,311,221 B1 | 10/2001 | Raz et al. | 709/231 |
| 6,317,761 B1 | 11/2001 | Landsman et al. | 707/7 |
| 6,349,137 B1 | 2/2002 | Hunt et al. | |
| 6,356,915 B1 | 3/2002 | Chtchetkine et al. | 707/200 |
| 6,363,400 B1 | 3/2002 | Chtchetkine et al. | 707/200 |
| 6,366,296 B1 | 4/2002 | Boreczky et al. | 345/719 |
| 6,378,035 B1 | 4/2002 | Parry et al. | 711/110 |
| 6,421,777 B1 | 7/2002 | Pierre-Louis et al. | 713/2 |
| 6,449,658 B1 | 9/2002 | Lafe et al. | 709/247 |
| 6,459,499 B1 | 10/2002 | Tomat | |
| 6,463,530 B1 | 10/2002 | Sposato | 713/2 |
| 6,473,794 B1 | 10/2002 | Guheen et al. | 709/223 |
| 6,477,531 B1 * | 11/2002 | Sullivan et al. | 707/10 |
| 6,490,677 B1 | 12/2002 | Aquilar et al. | 713/1 |
| 6,536,037 B1 | 3/2003 | Guheen et al. | 717/151 |
| 6,553,375 B1 | 4/2003 | Huang et al. | |
| 6,556,950 B1 | 4/2003 | Schwenke et al. | 702/183 |
| 6,574,618 B2 | 6/2003 | Eylon et al. | 707/1 |
| 6,606,744 B1 | 8/2003 | Mikurak | 717/174 |
| 6,625,651 B1 | 9/2003 | Swartz et al. | |
| 6,625,754 B1 | 9/2003 | Aguilar et al. | |
| 6,636,857 B2 | 10/2003 | Thomas et al. | 707/10 |
| 6,654,797 B1 | 11/2003 | Kamper | 709/220 |
| 6,654,801 B2 | 11/2003 | Mann et al. | |
| 6,694,375 B1 | 2/2004 | Beddus et al. | 709/249 |
| 6,697,852 B1 | 2/2004 | Ryu | |
| 6,704,886 B1 * | 3/2004 | Gill et al. | 714/6 |
| 6,718,464 B2 | 4/2004 | Cromer et al. | 713/2 |
| 6,728,530 B1 | 4/2004 | Heinonen et al. | |
| 6,735,625 B1 | 5/2004 | Ponna | 709/223 |
| 6,751,658 B1 | 6/2004 | Haun et al. | 709/222 |
| 6,757,729 B1 | 6/2004 | Devarakonda et al. | |
| 6,757,894 B2 | 6/2004 | Eylon et al. | 717/177 |
| 6,816,462 B1 | 11/2004 | Booth, III et al. | 370/248 |
| 6,816,882 B1 | 11/2004 | Conner et al. | |
| 6,871,210 B1 | 3/2005 | Subramanian | 709/203 |
| 6,880,108 B1 * | 4/2005 | Gusler et al. | 714/37 |
| 6,885,481 B1 | 4/2005 | Dawe | |
| 6,886,020 B1 | 4/2005 | Zahavi et al. | 707/204 |
| 6,915,343 B1 * | 7/2005 | Brewer et al. | 709/224 |
| 6,954,853 B2 | 10/2005 | Wang et al. | |
| 6,954,930 B2 | 10/2005 | Drake et al. | |
| 6,959,235 B1 * | 10/2005 | Abdel-Malek et al. | 701/33 |
| 6,985,967 B1 | 1/2006 | Hipp | |
| 7,003,560 B1 | 2/2006 | Mullen et al. | |
| 7,003,663 B2 | 2/2006 | Lagosanto et al. | |
| 7,058,698 B2 | 6/2006 | Chatterjee et al. | |
| 7,080,118 B2 | 7/2006 | Hildebrand | |
| 7,143,307 B1 | 11/2006 | Witte et al. | |
| 7,149,698 B2 | 12/2006 | Guheen et al. | |
| 7,175,078 B2 | 2/2007 | Ban et al. | |
| 7,178,166 B1 | 2/2007 | Taylor et al. | |
| 7,194,445 B2 | 3/2007 | Chan et al. | |
| 7,200,779 B1 * | 4/2007 | Coss et al. | 714/48 |
| 7,210,143 B2 | 4/2007 | Or et al. | |
| 7,237,122 B2 | 6/2007 | Kadam et al. | |
| 7,260,597 B1 | 8/2007 | Hofrichter et al. | |
| 7,287,053 B2 | 10/2007 | Bodin | |
| 7,328,367 B2 | 2/2008 | Ukai et al. | |
| 7,337,311 B2 | 2/2008 | Chen et al. | |
| 7,392,046 B2 | 6/2008 | Leib et al. | |
| 7,401,125 B1 | 7/2008 | Uchida et al. | |
| 7,480,822 B1 | 1/2009 | Arbon et al. | |
| 7,512,584 B2 | 3/2009 | Keith, Jr. | |
| 7,571,467 B1 | 8/2009 | Priestley et al. | |
| 7,627,694 B2 | 12/2009 | Sreenivasan et al. | |
| 7,698,487 B2 | 4/2010 | Rothman et al. | |
| 7,788,524 B2 | 8/2010 | Wing et al. | |
| 2001/0034736 A1 | 10/2001 | Eylon et al. | 707/200 |
| 2001/0037323 A1 | 11/2001 | Moulton et al. | 707/1 |
| 2001/0037399 A1 | 11/2001 | Eylon et al. | 709/231 |
| 2001/0037400 A1 | 11/2001 | Raz et al. | 709/232 |
| 2001/0044850 A1 | 11/2001 | Raz et al. | 709/231 |
| 2001/0049793 A1 | 12/2001 | Sugimoto | 713/200 |
| 2002/0007418 A1 | 1/2002 | Hegde et al. | 709/231 |
| 2002/0013827 A1 | 1/2002 | Edstrom et al. | |
| 2002/0035674 A1 | 3/2002 | Vetrivelkumaran et al. | |
| 2002/0042833 A1 | 4/2002 | Hendler et al. | 709/231 |
| 2002/0049764 A1 | 4/2002 | Boothby et al. | 707/100 |
| 2002/0083183 A1 | 6/2002 | Pujare et al. | 709/231 |
| 2002/0087625 A1 | 7/2002 | Toll et al. | |
| 2002/0087717 A1 | 7/2002 | Artzi et al. | 709/236 |
| 2002/0087883 A1 | 7/2002 | Wohlgemuth et al. | 713/201 |
| 2002/0087963 A1 | 7/2002 | Eylon et al. | 717/174 |
| 2002/0091763 A1 | 7/2002 | Shah et al. | 709/203 |
| 2002/0094868 A1 | 7/2002 | Tuck et al. | |
| 2002/0104080 A1 | 8/2002 | Woodard et al. | |
| 2002/0107920 A1 | 8/2002 | Hotti | |
| 2002/0116585 A1 | 8/2002 | Scherr | 711/133 |
| 2002/0124092 A1 | 9/2002 | Urien | 709/229 |
| 2002/0129089 A1 | 9/2002 | Hegde et al. | 709/200 |
| 2002/0138640 A1 | 9/2002 | Raz et al. | 709/231 |
| 2002/0157089 A1 | 10/2002 | Patel et al. | 717/178 |
| 2002/0161868 A1 | 10/2002 | Paul et al. | 709/221 |
| 2002/0161908 A1 | 10/2002 | Benitez et al. | 709/231 |
| 2002/0169797 A1 | 11/2002 | Hegde et al. | 707/500.1 |
| 2002/0188941 A1 | 12/2002 | Cicciarelli et al. | |
| 2003/0004882 A1 | 1/2003 | Holler et al. | 705/51 |
| 2003/0005096 A1 | 1/2003 | Paul et al. | 709/222 |
| 2003/0009538 A1 | 1/2003 | Shah et al. | 709/219 |
| 2003/0033379 A1 | 2/2003 | Civanlar et al. | 709/218 |
| 2003/0036882 A1 | 2/2003 | Harper et al. | |
| 2003/0037328 A1 | 2/2003 | Cicciarelli et al. | |
| 2003/0041136 A1 | 2/2003 | Cheline et al. | 709/223 |
| 2003/0046371 A1 | 3/2003 | Falkner | |
| 2003/0051128 A1 | 3/2003 | Rodriguez et al. | 713/100 |
| 2003/0055878 A1 | 3/2003 | Fletcher et al. | |
| 2003/0078960 A1 | 4/2003 | Murren et al. | |
| 2003/0110188 A1 | 6/2003 | Howard et al. | |
| 2003/0126242 A1 | 7/2003 | Chang | 709/222 |
| 2003/0140160 A1 | 7/2003 | Raz et al. | 709/231 |
| 2003/0191730 A1 | 10/2003 | Adkins et al. | |
| 2003/0204562 A1 | 10/2003 | Hwang | |
| 2003/0233383 A1 | 12/2003 | Koskimies | |
| 2003/0233493 A1 | 12/2003 | Boldon et al. | |
| 2004/0010716 A1 | 1/2004 | Childress et al. | |
| 2004/0068554 A1 | 4/2004 | Bales et al. | |
| 2004/0073787 A1 | 4/2004 | Ban et al. | |
| 2004/0093492 A1 | 5/2004 | Daude et al. | 713/156 |
| 2004/0104927 A1 | 6/2004 | Husain et al. | |
| 2004/0107273 A1 | 6/2004 | Biran et al. | |
| 2004/0123153 A1 | 6/2004 | Wright et al. | 713/201 |
| 2004/0128346 A1 | 7/2004 | Melamed et al. | 709/203 |
| 2004/0148306 A1 | 7/2004 | Moulton et al. | 707/101 |
| 2004/0180721 A1 | 9/2004 | Rowe | |
| 2004/0193876 A1 | 9/2004 | Donley et al. | |
| 2004/0201604 A1 | 10/2004 | Kraenzel et al. | 345/700 |
| 2004/0236843 A1 * | 11/2004 | Wing et al. | 709/219 |
| 2004/0243928 A1 | 12/2004 | Hesmer et al. | |
| 2005/0027846 A1 | 2/2005 | Wolfe et al. | |
| 2005/0033808 A1 | 2/2005 | Cheng et al. | |
| 2005/0044197 A1 | 2/2005 | Lai | |
| 2005/0044544 A1 | 2/2005 | Slivka et al. | |
| 2005/0108297 A1 | 5/2005 | Rollin et al. | |
| 2005/0108546 A1 | 5/2005 | Lehew et al. | |
| 2005/0108593 A1 | 5/2005 | Purushothaman et al. | |
| 2005/0144218 A1 | 6/2005 | Heintz | 709/202 |
| 2005/0149729 A1 | 7/2005 | Zimmer et al. | 713/168 |
| 2005/0160289 A1 | 7/2005 | Shay | |
| 2005/0193245 A1 | 9/2005 | Hayden et al. | |
| 2005/0198196 A1 | 9/2005 | Bohn et al. | |
| 2005/0216524 A1 | 9/2005 | Gomes et al. | |
| 2005/0216902 A1 | 9/2005 | Schaefer | |
| 2005/0226059 A1 | 10/2005 | Kavuri et al. | |
| 2005/0256952 A1 | 11/2005 | Mouhanna et al. | |
| 2005/0262503 A1 | 11/2005 | Kane | |
| 2005/0268145 A1 | 12/2005 | Hufferd et al. | |
| 2005/0273486 A1 | 12/2005 | Keith, Jr. | 709/200 |
| 2005/0283606 A1 | 12/2005 | Williams | 713/166 |
| 2005/0286435 A1 | 12/2005 | Ogawa et al. | |
| 2006/0021040 A1 | 1/2006 | Boulanger et al. | 726/23 |
| 2006/0031377 A1 | 2/2006 | Ng et al. | |
| 2006/0031407 A1 | 2/2006 | Dispensa et al. | |
| 2006/0031529 A1 | 2/2006 | Keith, Jr. | 709/227 |
| 2006/0041641 A1 | 2/2006 | Breiter et al. | |

| | | |
|---|---|---|
| 2006/0041759 A1 | 2/2006 | Kaliski, Jr. et al. |
| 2006/0047716 A1 | 3/2006 | Keith, Jr. .................. 707/203 |
| 2006/0047946 A1 | 3/2006 | Keith, Jr. ........................ 713/2 |
| 2006/0074943 A1 | 4/2006 | Nakano et al. |
| 2006/0095705 A1 | 5/2006 | Wichelman et al. .......... 711/171 |
| 2006/0129459 A1 | 6/2006 | Mendelsohn |
| 2006/0143709 A1 | 6/2006 | Brooks et al. .................... 726/23 |
| 2006/0179061 A1 | 8/2006 | D'Souza et al. |
| 2006/0224544 A1 | 10/2006 | Keith, Jr. ......................... 706/60 |
| 2006/0224545 A1 | 10/2006 | Keith, Jr. ......................... 706/60 |
| 2006/0233310 A1 | 10/2006 | Adams, Jr. et al. |
| 2007/0078982 A1 | 4/2007 | Aidun et al. |
| 2007/0094269 A1 | 4/2007 | Mikesell et al. |
| 2007/0143374 A1 | 6/2007 | D'Souza et al. |
| 2007/0174658 A1 | 7/2007 | Takamoto et al. |
| 2007/0174690 A1 | 7/2007 | Kambara et al. |
| 2007/0185936 A1 | 8/2007 | Derk et al. |
| 2007/0239905 A1 | 10/2007 | Banerjee et al. ................. 710/22 |
| 2007/0271290 A1 | 11/2007 | Keith, Jr. ....................... 707/101 |
| 2007/0271428 A1 | 11/2007 | Alturi |
| 2007/0274315 A1 | 11/2007 | Keith ............................ 370/392 |
| 2007/0276836 A1 | 11/2007 | Chatterjee et al. |
| 2008/0034019 A1 | 2/2008 | Cisler et al. |
| 2008/0034071 A1 | 2/2008 | Wilkinson et al. |
| 2008/0077622 A1 | 3/2008 | Keith ............................. 707/200 |
| 2008/0077630 A1 | 3/2008 | Keith ............................. 707/204 |
| 2008/0127294 A1 | 5/2008 | Keith ................................. 726/1 |
| 2008/0209142 A1 | 8/2008 | Obernuefemann |
| 2008/0216168 A1 | 9/2008 | Larson et al. |
| 2008/0294860 A1 | 11/2008 | Stakutis et al. |
| 2008/0313632 A1 | 12/2008 | Kumar et al. |
| 2009/0094362 A1 | 4/2009 | Huff |
| 2010/0050011 A1 | 2/2010 | Takamoto et al. |

OTHER PUBLICATIONS

"Microsoft @ Computer Dictionary, Fifth Edition", 2002, 3 pages.*
Definition of plug-in from Wikipedia, printed on Jun. 18, 2011, 1 page.*
Plug-in definition from Wikipedia, http://en.wikipedia.org/wiki/Plug-in_(computing) printed Nov. 6, 2011, 5 pages.*
VMWARE, VMware Infrastructure Architecture Overview, Jun. 14, 2006, http://www.vmware.com/resourse/techresources/, pp. 1-14.
VMWARE, Using VMware Infrastructure for Backup and Restore, Oct. 26, 2006, http:/www.vmware.com/resourse/techresources/, pp. 1-20.
IBM Corporation, AFS: "User Guide", First Edition, Version 3.6. Apr. 2000, pp. 112.
Shepler et al. "RFC 3530—Network File System (NFS) version 4 Protocol", Standards Track, Apr. 2003, pp. 278, http://tools.ietf.org/html/rfc3530#page-119.
Tridgell, A., "Efficient Algorithms for Sorting and Synchronization," Thesis, The Australian National University, Feb. 1999, 106 pages.
MacDonald, J.P., "File System Support for Delta Compression," University of California at Berkeley, Dept. of Electrical Engineering and Computer Sciences, May 19, 2000, 32 pages.
Yu et al., "Scalable network resource management for large scale Virtual Private Networks," Simulation Modeling Practice and Theory, 12 (2004) pp. 263-285.
Cisco PIX "Configuring an IPSec Tunnel Between a Cisco Secure PIX Firewall and a Checkpoint NG Firewall," May 12, 2006, document ID 23785, 14 pages.
Microsoft Press, Microsoft® Computer Dictionary, Fifth Edition, May 1, 2002, p. 39.
Muthitacharoen et al., "A Low-bandwidth Network File System," MIT Laboratory for Computer Science and NYU Department of Computer Science, 2001, 14 pages.
Random House Unabridged Dictionary, "device: meaning and definitions," 1997, Random House Inc., retrieved via "http://dictionary.infoplease.com/device", 2 pages.

* cited by examiner

| ID | Class | Platform | Product | Description | Criteria | Remediation Description | Remediation Script |
|---|---|---|---|---|---|---|---|
| 302 | 304 | 306 | 308 | 310 | 312 [Test_ref] (313) | 314 | 316 |

```
<diag>
    <id>5</id>
    <version>1.0</version>
    <date_created>1.0</date_created>
    <date_modified>1.0</date_modified>
    <maxsp_url></maxsp_url>
    <order>3</order>
    <name>Ethernet card errors</name>
    <category>hardware</category>
    <family>Hardware Management</family>
    <repairable>no</repairable>
    <desc_language>English</desc_language>
    <desc>Your ethernet card is reporting errors. This may be due to faulty
            network card, cable or other hardware.
    <remediation>1. First, replace your ethernet cable or re-seat the
            cables.  2.  You may need to replace the ethernet card.
    </remediation>
    <script_lang>max1</script_lang>
    <diag_script>
        let ethers = F$GETWMI('ethport1', 'counters')
        If (ethers > 0)  then
            F$TMPSTOR('ethernet counters', ethers)
            Return 8
        endif
    </diag_script>
    <repair_script></repair_script>
    <platforms>Windows</platforms>
    <dependency></dependency>
    <confidence><confidence>
    <health_index></health_index>
</diag>
```

COMPUTER HARDWARE AND SOFTWARE DIAGNOSTIC AND REPORT SYSTEM

RELATED APPLICATION(S)

This application is a continuation-in-part of U.S. patent application Ser. No. 11/368,214, filed on Mar. 2, 2006 now U.S. Pat. No. 7,512,584 and entitled "COMPUTER HARDWARE AND SOFTWARE DIAGNOSTIC AND REPORT SYSTEM" which is hereby incorporated by reference, and which claims priority under 35 U.S.C. §119(e) of the co-owned U.S. Provisional Patent Application Ser. No. 60/658,970, filed Mar. 4, 2005, and entitled "PRE-INSTALL COMPLIANCE AND CENTRAL PROBLEM DISCOVERY SYSTEM." The Provisional Patent Application Ser. No. 60/658,970, filed Mar. 4, 2005, and entitled "PRE-INSTALL COMPLIANCE AND CENTRAL PROBLEM DISCOVERY SYSTEM" is also hereby incorporated by reference in its entirety.

The following co-owned, co-filed, co-pending U.S. patent application Ser. No. 11/368,212, filed Mar. 2, 2006 and entitled PRE-INSTALL COMPLIANCE SYSTEM is also incorporated by reference.

FIELD OF THE INVENTION

The present invention relates to the field of computer system maintenance. More specifically, the present invention relates to the field of testing computer systems for configuration problems and providing remediation solutions to the discovered problems.

BACKGROUND OF THE INVENTION

With the complexity and interoperability of software and hardware today, it is very difficult to install or remove one program without having an effect on one or more pre-existing programs. Microsoft® Windows® operating systems as well as other operating systems have a plethora of components that all must maintain their integrity, otherwise the operating system becomes unstable and possibly fails. Furthermore, generally when hardware is installed, software drivers which allow the hardware to communicate with the software must be installed as well. If these drivers are corrupted, the hardware will not function properly. Additionally, many software programs have components beyond a main executable file which allow the programs to communicate with the operating system, and if these components are deleted or modified incorrectly, the program will no longer function. All of these components, whether they be part of the operating system, hardware or other software, must be able to co-exist without harming each other. Specifically, when the system is modified in some way such as by installing or removing a piece of hardware or a software program, the system should do it so that everything still functions correctly. Furthermore, over time, modifications are made to the system such as updating drivers and installing patches, and these modifications may adversely affect other components of the system. Also, if a user neglects to update his system, he could leave the system open to attacks by viruses or other intruders. So either by action or inaction, a user's system has the potential for issues, and such issues should be monitored.

There are many products which monitor a system or attempt to repair components of the system, but they all have their shortcomings and do not provide the full package to adequately ensure a stable system environment.

Windows® registry repair programs such as Registry Mechanic™ developed by PC Tools™ aid a user in cleaning, repairing and optimizing the Windows® registry. Registry Mechanic™ uses a detection algorithm to scan a user's registry and identify missing and invalid references in a user's registry. Then a list is provided of the registry errors found, so that a user is able to selectively choose to clean each item or automatically repair all of them.

BMC Software and Computer Associates International develop performance software, but these software packages tend to be host based software products.

Other products like security vulnerability scanning software, spyware/virus scanners and patch management software assist in maintaining a stable computing environment. Very well known companies like McAfee and Symantec develop virus scanners to protect a user's computer from being harmed by viruses. Viruses are computer programs which have the ability to disrupt and damage a user's system. The products from these companies are able to scan a user's system and locate irregular programs that fit certain definitions stored in a database. Upon detecting a virus, a user is able to remove the problem and hopefully avoid harm to his computer system. STEALTHbits Technologies develops a program called stealthAUDIT for Exchange. The program is an agentless auditing and conformance management platform that enables users to identify changes in the system to avoid problems by performing discreet patch scanning. However, these products are very focused exclusively on their specific areas of technology such as virus checking or patch management and do not include an entire package for maintaining system stability.

There are significant problems with the aforementioned options. They are not necessarily end user friendly. They do not focus on overall user support or computer reliability. They are not Application Service Provider (ASP) friendly. Furthermore, they lack other significant features. Hence, a solution is needed to overcome these issues.

SUMMARY OF THE INVENTION

The present invention tests computer systems for defects that are able to cause performance and functional problems. An agent application is first installed on a user's system. The agent application then retrieves problem data from the expert system library pertinent to the user's operating environment. The agent application tests the user's system for each problem description within a downloaded data structure from the expert system library. If a problem is discovered, then a script attempts to remediate the problem and/or a notification is sent to the user describing the issue. If an unknown problem arises, a feedback mechanism expands the expert system library by sending a notification that a problem was discovered. The feedback is then utilized to increase the total knowledge in the expert system library. Then when another user with a similar or the same setup is tested, the agent application will recognize the issue and will take the appropriate remedial actions.

In one aspect, a system for monitoring a computing device comprises a plurality of programs for interacting with the computing device to gather information and a plurality of scripts coupled to the plurality of programs for initiating the plurality of programs. Interacting with the computing device further comprises determining a setup of the computing device, gathering information related to configuration of the computing device and analyzing the computing device. The plurality of scripts are less complex than the plurality of programs. The plurality of scripts return a condition status. In some embodiments, the condition status is a binary-type value. The system runs in the background of the computing device. The plurality of scripts run in a specified order. The plurality of scripts are stored within an expert system library. The system further comprises a user interface coupled to the plurality of scripts for interacting with a user. The system further comprises a feedback mechanism for sending feedback to an expert system library. The feedback mechanism expands the expert system library. The system further comprises a reporting mechanism to report one or more problems. The plurality of scripts are embedded within an extensible markup language (XML) structure. The computing device is selected from the group consisting of a/an personal computer, Apple computer, thin client, laptop, cell phone and PDA. Gathering information includes discovering one or more problems.

In another aspect, a system for monitoring a computing device while running in the background of the computing device comprises a plurality of programs for determining a setup of the computing device, gathering information related to configuration of the computing device and analyzing the computing device for one or more problems, a user interface coupled to the plurality of programs, the user interface for interacting with a user and a plurality of scripts coupled to the plurality of programs and to the user interface for acting as an intermediary between the plurality of programs and the user interface, wherein each of the plurality of scripts return a condition status. In some embodiments, the condition status is a binary-type value. The plurality of scripts are less complex than the plurality of programs. The plurality of scripts run in a specified order. The plurality of scripts are stored within an expert system library. The system further comprises a feedback mechanism for sending feedback to an expert system library. The feedback mechanism expands the expert system library. The system further comprises a reporting mechanism to report the one or more problems. The plurality of scripts are embedded within an extensible markup language (XML) structure. The computing device is selected from the group consisting of a/an personal computer, Apple computer, thin client, laptop, cell phone and PDA.

In another aspect, a method of monitoring a computing device to gather information comprises determining a setup of the computing device, gathering information related to configuration of the computing device and analyzing the computing device. Analyzing the computing device further comprises querying the computing device for one or more problems. The method further comprises initiating one or more remediation scripts if one or more problems are detected. The method further comprises sending feedback to an expert system library. The method further comprises expanding the expert system library using the feedback mechanism. The method further comprises reporting one or more problems. The computing device is selected from the group consisting of a personal computer, an Apple computer, a thin client, a laptop, a cell phone and a PDA.

In another aspect, a method of monitoring a computing device to gather information comprises determining a setup of the computing device, gathering information related to configuration of the computing device, analyzing the computing device, reporting analysis on the computing device and sending feedback to an expert system library. Analyzing the computing device further comprises querying the computing device for one or more problems. The method further comprises initiating one or more remediation scripts if one or more problems are detected. The method further comprises expanding the expert system library using the feedback mechanism. The computing device is selected from the group consisting of a personal computer, an Apple computer, a thin client, a laptop, a cell phone and a PDA.

DETAILED DESCRIPTION OF THE PREFERRED EMBODIMENT

The present invention is a system and method for using an expert system library of computer configuration problems to test individual computer systems for the existence of problems and then providing remediation solutions for each discovered problem. The system enables maintenance procedures and requirements for system competence to be centralized and distributed, providing an end user a solution to scan his system for configuration problems and to manually or automatically resolve these problems. Configuration problems include, but are not limited to, incomplete software package install and de-installs, incorrect Windows® registry values, software release and patch release issues, software driver problems, network configuration and connectivity, performance issues and many other problems.

The present invention provides the ability to build a central expert system library repository with constructive input from multiple sources. The system is also able to support an application service provider (ASP) infrastructure and business enterprise applications. Furthermore, software applications have the ability to run disconnected from the central server and network. The system is scaleable so that it has the ability to support extremely large ASP user bases over disparate network topologies. The system supports subscription licenses, so that when the subscription is void or expired, the desktop software will be disabled and inactive. The system also supports disparate end-user hardware including Personal Computers (PCs), Apple PC's, thin clients, laptops, cell phones, PDA's and other mobile devices. The present invention utilizes a plug-in model so that each entry in the expert system library is discrete, allowing multiple authors to add to the central repository independently.

The present invention generally comprises four main components: a central compatibility expert system library, a host resident client interrogation agent, problem reporting and remediation mechanisms and a user support feedback mechanism.

Any of the many software and hardware configuration problems is able to be described discretely. Each problem, when stored in a format usable by software resident on an end-user's system, is able to be processed serially, meaning one problem at a time. In an alternative embodiment, problems are processed in parallel, meaning at the same time. The central expert system library stores the problem and resolution information. The information is able to be retrieved and communicated to end-user clients via a problem language and protocol. The information stored includes shared software module names and revisions, hardware driver prerequisites, hardware requirements, operating system revision levels and other operating environment prerequisites. The expert system library also contains software and hardware exceptions.

A plurality of discrete programs are utilized to address these problems. As knowledge grows, the library grows and thousands of discrete programs are developed. For example, initially the system knows how to problem solve internal issues related to CPUs, motherboards, hard disk drives, RAM, video cards, power supplies and software. However, as information is discovered related to other components, the expert system library is able to grow and trouble shoot those areas as well. These other components include for example, networking components such as network cards, cables and routers and peripheral devices such as printers, scanners and digital cameras. Furthermore, new products are continuously developed and with each new product, new issues arise, hence it is crucial to have the ability to continuously increase the expert system library's knowledge.

The discrete programs execute desired tasks and are able to remediate certain issues. For example, the function ethernet_counter determines if an ethernet cable is functioning correctly. If ethernet_counter returns values that increase over time, then the cable is likely not performing well and should be replaced. For such an issue, a user must manually replace the cable. However, if there is a software problem such as a conflict between device drivers, a program is able to automatically update the drivers to avoid the conflict if that is the proper remedy.

Agent software installed on an end user's system is resident and thereby able to interrogate the user's system for hardware and software configurations. The information obtained by the interrogation is used in conjunction with the expert system library to ascertain whether there are problems on an end-user's system. The expert system library describes individual prerequisites such as software versions, registry values and hardware and software configurations which are invalid or problematic. The agent application then uses the information to interrogate the client system for the existence of these problems. The discrete programs run in the background while monitoring the computing system. When an issue arises, the programs are executed in a specified order to analyze a particular aspect of the computing device. Generally, a program first determines the setup, then gathers system information such as licenses, software running and hardware configurations and then finally the system is analyzed. Analysis includes determining any problems and addressing them as deemed appropriate using scripts and programs. Furthermore, issues are assigned a severity or a priority so that high priority items are dealt with quickly. Additionally, there are health risks assigned to ensure the most important issues are corrected before any harm is done. For example, if there is a problem with a user's hard drive, that would be considered a high priority and also a high health risk because data might be written incorrectly resulting in data loss. However, if there is a problem with an ethernet cable dropping some packets, the priority is still high because a user desires a fast connection to the network, but the health risk is low since the only harm is that the user's access to the network is slower.

The agent software has many different functions, allowing it to accomplish a variety of tasks. The agent software is able to report issues that are found, making it a reporting engine, an inventory system, a security system and a performance manager. The agent software uses a language engine for performing the analysis. Although very complex tasks are being performed at times, the resultant script language is simplified for easy modification and interoperability. An interface environment uses the built in functions of the software to simplify what the user views. The interface environment, also referred to as the data entry screen, prompts the user for information. Simple and easily understood scripts are coupled to the interface environment. Then, beneath the scripting language is a more complex language which performs the underlying tasks necessary to remedy whatever situation exists. The scripts are generally less complex than the underlying programs to provide simplicity of interaction with the user interface. The underlying programs are necessary to interact with the system's hardware and software, thus need to have the specific abilities to accomplish such tasks. The scripts take the information from the programs and return a condition status. In some embodiments, the condition status is binary-type value such as "true" or "false," "1" or "0" or a similar value. In other embodiments, the condition status is a string, ASCII value or other value representing status.

For example, if a user is having troubling viewing a web page on the Internet, the present invention will analyze the situation. There are many possible causes of this problem such as the web site being temporarily down or the user's internet connection not functioning properly. The present invention attempts to determine the root cause of the problem. A script initially asks if the host is available. The script uses the well known ping program or a program similar to the ping program to contact the host. Although the ping program returns data including the number of packets sent, received, lost, in addition to the round-trip time for the packets, that information is able to be consolidated into a binary form of an answer by the script. In particular, if the packets lost is equal to the packets sent, then the host is not available. So a script would ask something such as "Is the host available?" There are two possible responses from the script, "yes" the host is available or "no" it is not. As such, the script returns a much simpler and user-friendly response. Depending on the response, it is determined what else is required to pinpoint the problem. As shown, the script is simple in that it contacts specific programs to analyze the system and based on those responses, returns a binary-type answer.

The expert system library is compartmentalized, so that each component is able to handle a specific task. An example of the present invention in use is in the area of network analysis. There are a plethora of aspects of networking that could contribute to a user not being able to access the network. Furthermore, to check each aspect is a burdensome and slow process. However, with the present invention, the specific tasks are already designated and are then checked in a specified order. The broadest issues are addressed first and gradually the focus is narrowed to the specific component that is causing the problem. For example, if there is a problem connecting to the network, the following set of queries are used to determine why there is the problem. Is there a network device? If there is a network device, is it configured properly? Is the net device driver installed? Is the IP stack active? Is the IP stack DNS configured? Is the IP DNS active? Is there a default gateway? Is the default gateway responding? Is the first node after the gateway responding? Is the Internet accessible? Is the connection dropping packets? Are the tuning parameters set on the IP stack? Are the parameters set on the NetBios stack? Thus, based on the results of these queries, the present invention is able to identify where the problem is stemming from. As described above, the process of finding the answers to these questions is tedious and generally too complex for an average user, hence implementing the present invention not only improves efficiency and provides security, but it also enables those who are not computer savvy to accomplish tasks they otherwise would not be able to.

Contained within the expert system library is information describing the resolution of problems. The descriptions range from simple to complex and are able to include a variety of data such as user instructions on problem resolution or scripts which automatically resolve the end-user configuration problem. Resolutions include, but are not limited to, removal/cleanup of software de-installations, removal of invalid configuration information, installation of patches and others.

The present invention when used by a larger support organization is able to be an extremely valuable system to end users. Each time a customer reports a problem and the support organization corrects the problem within the software deployment, the correction procedure or script is added to the central expert system library. The feedback mechanism will continuously expand the expert system library and ensure each new software system is tested for a wider and more comprehensive group of problems and has solutions to resolve such problems. Once the expert system library has stored every possible problem, all customers of the support organization are able to potentially have their systems run securely with high stability.

Figure 1:
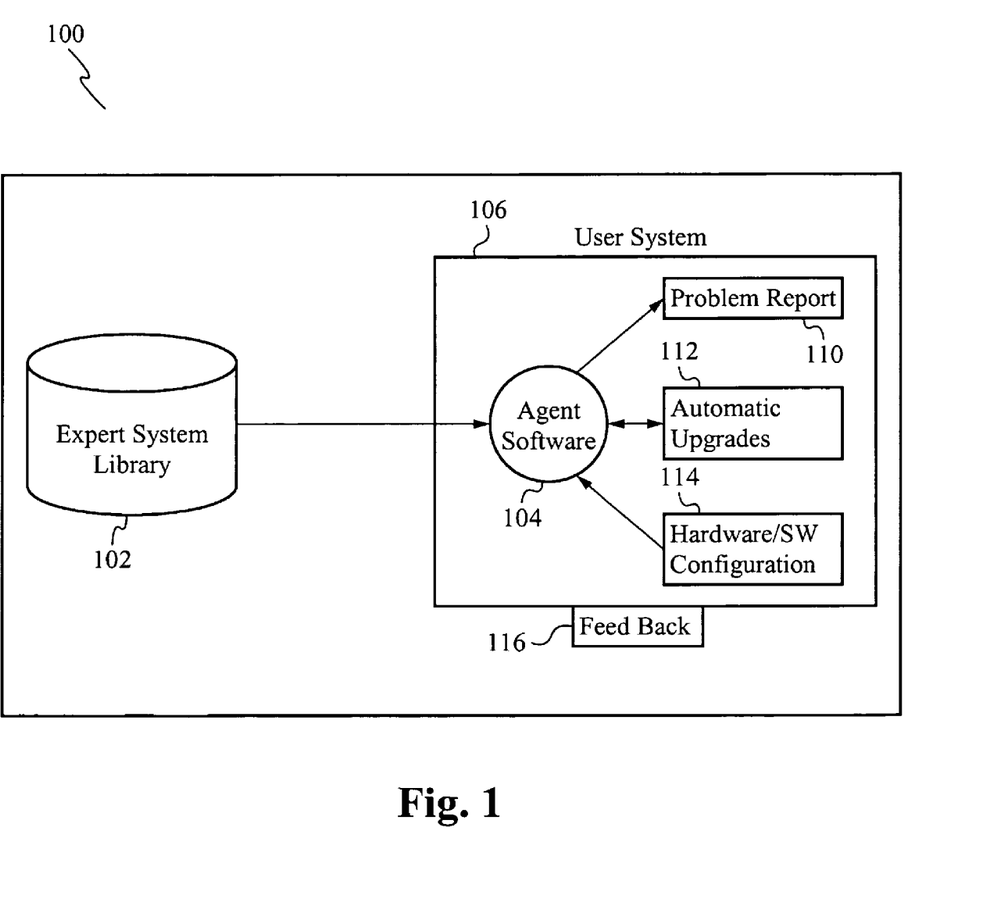
FIG. 1 illustrates a block diagram representation of the main components of the preferred embodiment of the present invention.

FIG. 1 illustrates a block diagram representation of the main components of the preferred embodiment of the present invention 100. In the preferred embodiment of the present invention, an expert system library 102 stores information about software packages and hardware and software configurations 114 required to support the software packages. An agent application 104 is located on one or more user systems. The agent application 104 interrogates the user system 106 for hardware and application configurations. Using the information obtained from the interrogations, the agent application 104 is able to determine if there are any problems. If there are any problems, then the agent application 104 reports the problem to the end-user and/or initiates a remediation script to repair the problem. Furthermore, the agent application 104 is able to receive automatic upgrades 112 so that it is able to continue protecting against improper installations and also automatically upgrade the user system 106. A feedback mechanism 116 sends any newly discovered problem information to the expert system library 102, so that the expert system library 102 is able to incorporate such a problem and will be able to detect and resolve it in the future. The expert system library 102 is able to be continuously grow so that it is able to detect more and more issues as time passes. All of the components of the preferred embodiment of the present invention function to assist a user in detecting conditions that will potentially corrupt the user system 106 and then grow the expert system library 102 when new issues are discovered, so that they will be detected in other systems in the future.

Figure 2:
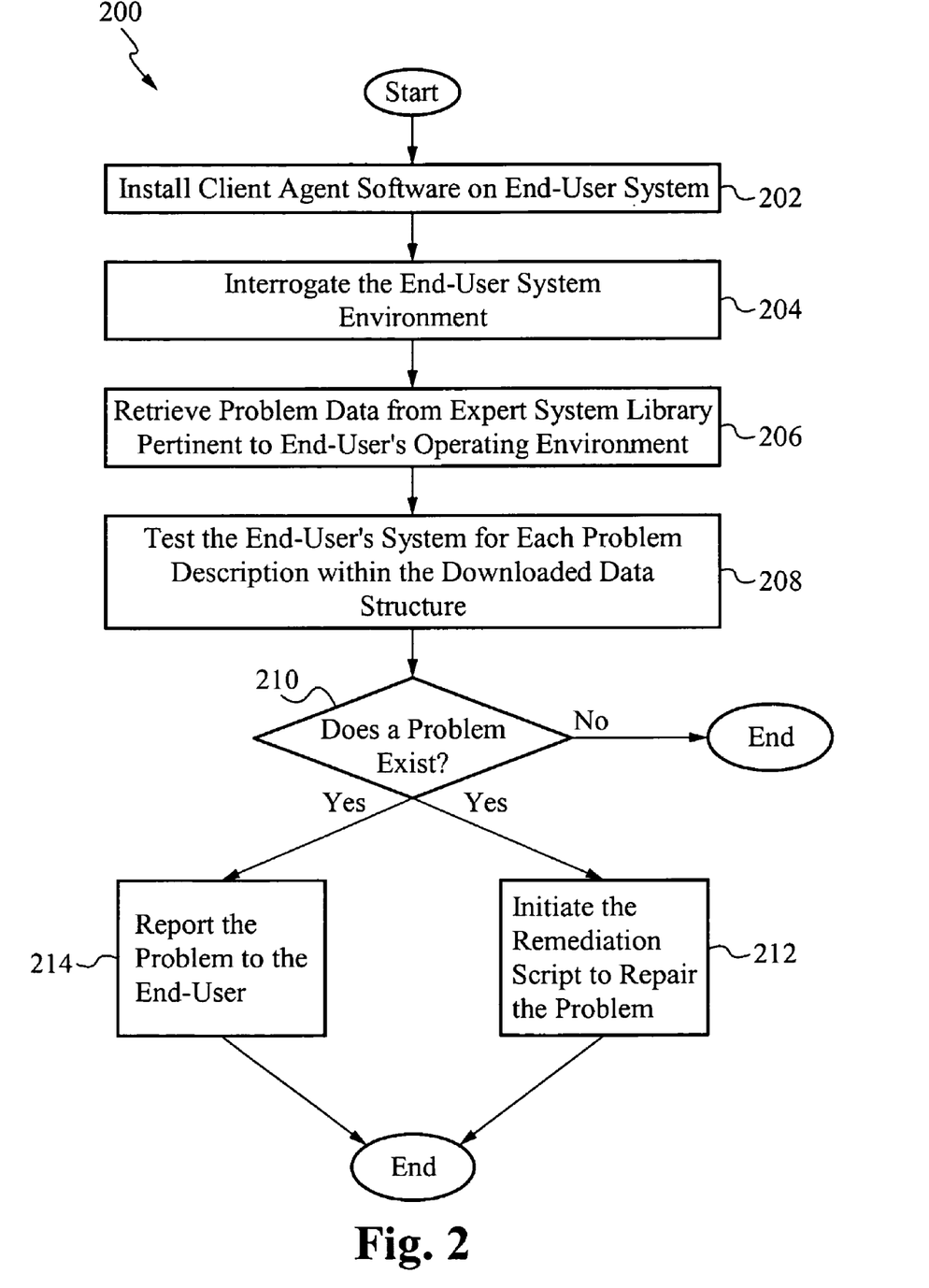
FIG. 2 illustrates a flowchart of the agent application determining if there are any problems.

FIG. 2 illustrates a flowchart of the agent application determining whether there is a problem that needs to be remedied 200. At the step 202, the agent application is installed on the end-user's system. The agent application is able to come pre-installed on a user's system or a user is able to download the agent application as needed. At the step 204, the agent application interrogates the end-user system for the basic environment. At the step 206, the agent application retrieves problem data from the expert system library pertinent to the end-user's operating environment. For example, if the operating environment is Windows® NT, then problem data related to Windows® NT is retrieved. At the step 208, the agent application tests the end-user's system for each problem description within the downloaded data structure. At the step 210, the agent application determines if any of the problems are detected. If the end-user system does have problems, then the agent application either reports the problems to the end-user at the step 214 and/or initiates the remediation script to repair the problem at the step 212.

There are a wide range of problem conditions that the end-user system is able to detect in the step 210. The following are examples of problem conditions tested by the agent application; however, they are not meant to limit the invention in any way. Software is tested for problems such as problematic software patch revisions, incompatible software packages, problematic software installations and problematic software package un/de-installations. The operating system is also checked, such as Windows® registry corruption and existing performance issues. Environmental issues are investigated such as low disk space or hardware errors. Network issues are checked such as interface errors, DNS or IP configuration problematic, IP routing failure and ISP network performance. Other important elements of a secure system are investigated such as detecting viruses, driver problems and serious security vulnerabilities. Any issues that could create system instability are also able to be investigated.

Figure 3:
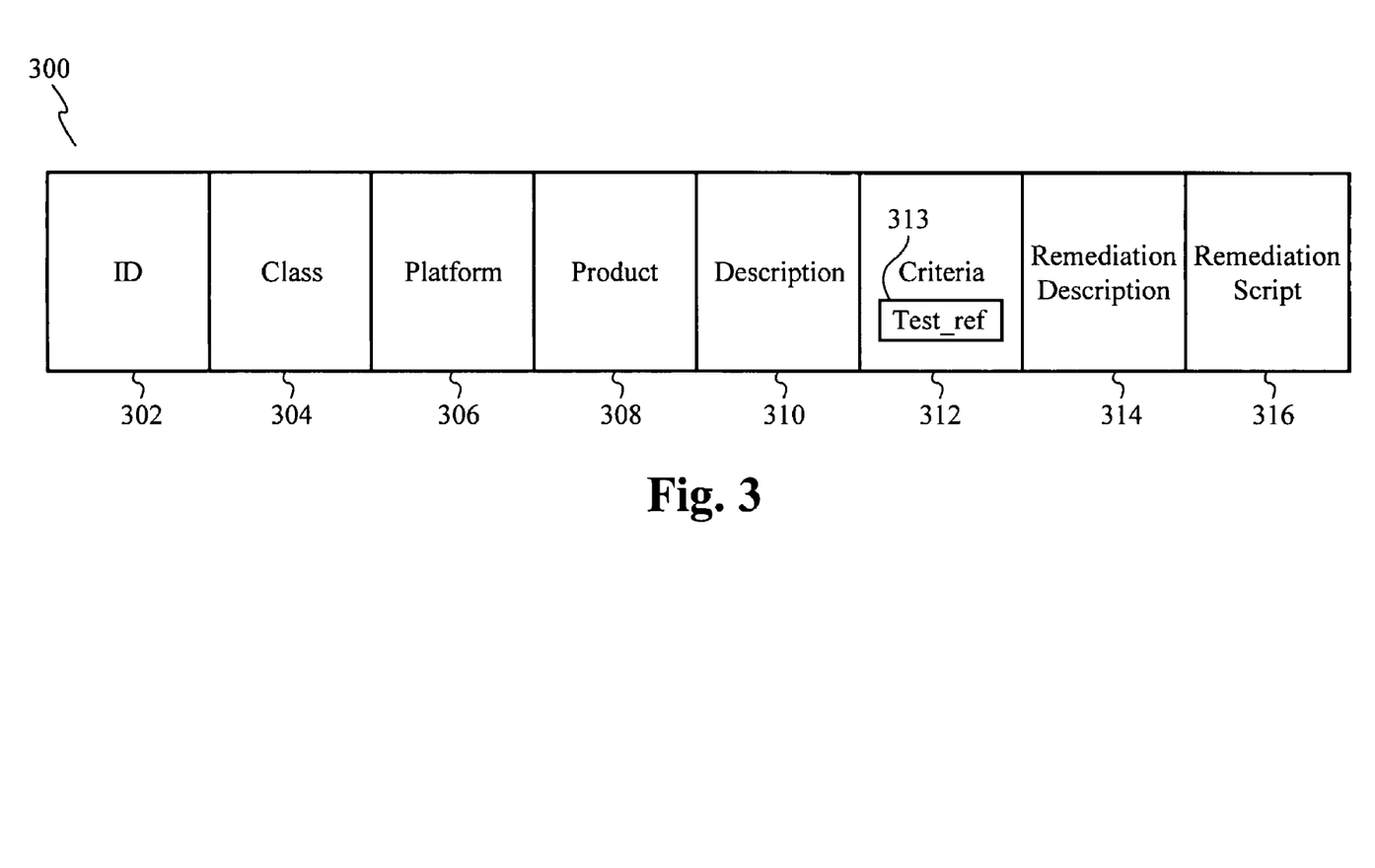
FIG. 3 illustrates an example data structure for the expert system library.

FIG. 3 illustrates an example data structure for the expert system library. The expert system library transfers data structures to the agent so that the client is able to perform checks to determine if there are any problems. The preferred format for the data structures is an embedded language with XML wrapping, although any format is acceptable. The example data structure 300 has the following item definitions within it. An ID item 302 stores the test record number. A class item 304 holds the type of test to be performed, such as performance, software patch level, security, virus or software inconsistency. A platform item 306 stores the operating system environment information, for example Windows NT, ME or XP. A product item 308 contains the affected application's information. The product item 308 is a specific component that needs to be investigated such as the Windows Shell or a specified application. A description item 310 stores a detailed description of the problem described. A criteria item 312 holds the subroutine used to identify test criteria. Within the criteria item 312, a test_ref subroutine 313 is used to identify test criteria. Although only one test_ref subroutine 313 is shown in FIG. 3, the criteria item 312 is able to hold a number of test_ref subroutines 313 depending on what test criteria is needed. A remediation description item 314 contains instructions on how to repair the problem described, and a remediation script item 316 stores one or more scripts to automatically remediate the problem described.

Figure 4:
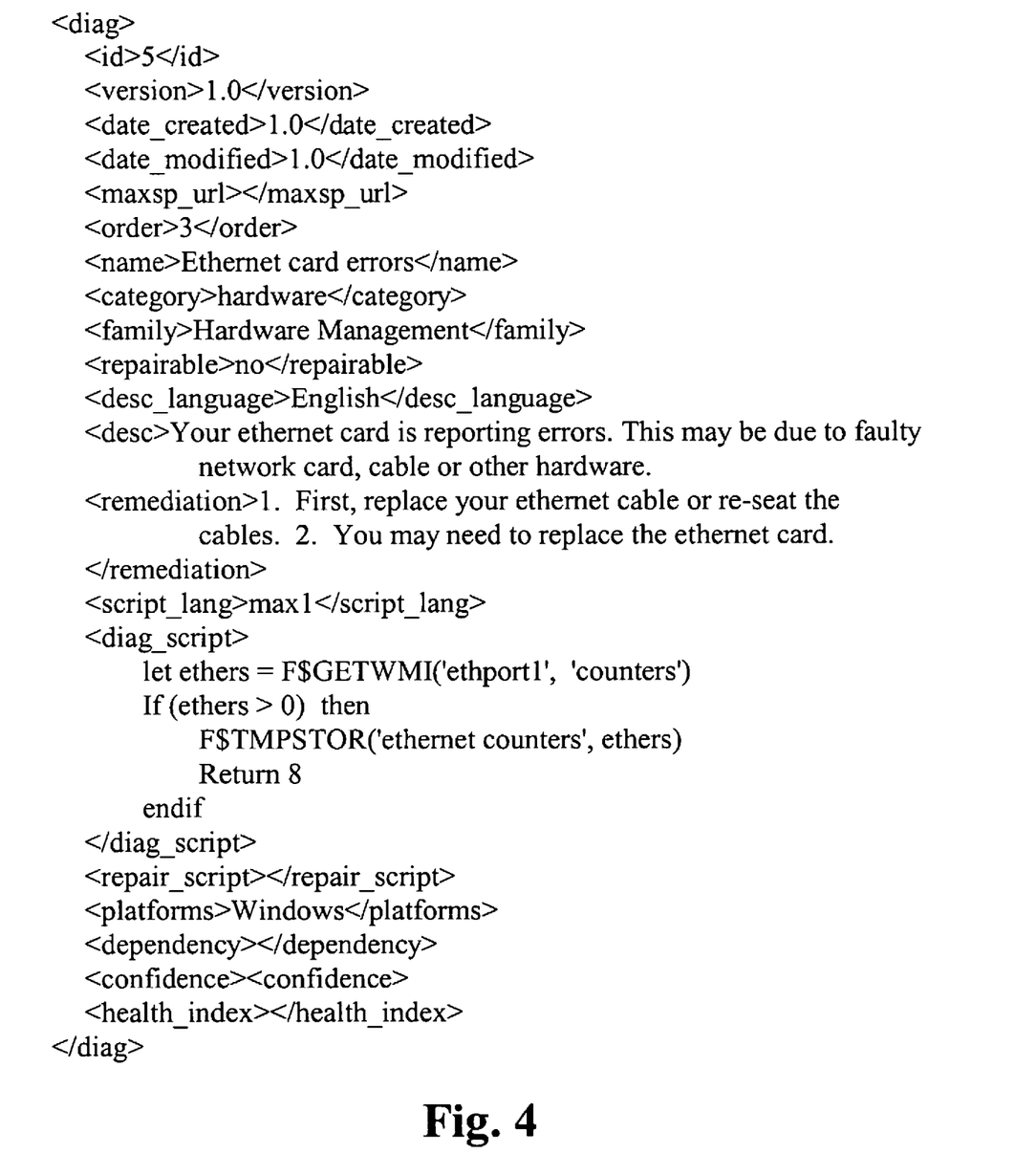
FIG. 4 illustrates an example XML coded version of a data structure for the expert system library.

FIG. 4 illustrates an example XML coded version of a data structure of the expert system library. In the example, the ID item is "5." The platform item is "Windows." Furthermore, the category is "hardware" and the family is "Hardware Management." Hence, the agent application knows that it needs to investigate issues concerning hardware management of Windows®. Additional items are able to be included in the data structure as well such as a dependency, confidence and health index. The date_created and date_modified items are useful in determining when the data structure was created or modified which helps in the process of problem solving. The description item describes the problem, which in this example, is that the "ethernet card is reporting errors." Diagnostic script language is included to determine the status of the hardware or software. Remediation information is used to help resolve the problem, such as a suggestion to "replace your ethernet cable." If proper, a remediation script is included to automatically correct the problem. As described above, in the example, the data structure comprises the items required to perform system checks to aid in determining potential conflicts on a user's system. The aforementioned example is not meant to limit the present invention in any way.

The agent application is host-based software, pre-installed on an end user system. The application is an interpreter for the data structure downloaded from the central expert system library and a library of functions. The functions primarily access information about a user's system or remediate a user's system. For example, one function is able to query an operating system to determine if it has a certain patch installed, and another function is able to install the patch. The agent application is also responsible for reporting problems found. Other functions of the agent application include, but are not limited to, accessing hardware error counts, reading/writing the Windows® registry, accessing software modules and version/patch levels, moving, copying and removing files from the file system, reading operating system environment such as memory and disk space, updating virtual memory configurations and many other functions to maintain a stable environment.

The expert system library utilizes a plug-in architecture. Each expert system library record has functionality of a discrete program such that each entry is able to be added to the expert system library without affecting the other expert system library entries and updated or removed from the expert system library with no effect on the other problem records. Such a plug-in architecture allows multiple authors to maintain different problem records independently of simultaneous work being done on other problem records.

The expert system library data structure includes procedural language elements including, but not limited to, boolean logic, string manipulation, flow control verbs and simple match functions. The language provides a system interpretation tightly integrated with the operating system. The language is used to create powerful and flexible mechanisms to test for the existence of problem conditions. For example the following language function tests the Windows® registry for the existence of a value:

```
str regvalue
str regkey
regkey =
'\HKEY_LOCAL_MACHINE\SOFTWARE\Microsoft\WindowsNT\
CurrentVersion\Hotfix\Q31
2895'
regvalue = F$GETREG(regkey)
if (regvalue != '<error>') then
    return 9 //signal hotfix not installed
else
    return 0 //signal hotfix installed
endif
```

The example language checks if the HotFix (Patch) is installed by analyzing the value of the Windows® registry value at Q312895. If the value is not an error, then the Microsoft® patch is installed. Further, the routine is able to check for one or more code modules which are supposed to be updated by this patch. If the code module version is less than the correct value, then the registry has the patch recorded as installed, but the actual code module could be below the correct value, which would mean the patch was installed but the installation failed.

The language interpreter, part of the agent application, contains a set of functions which are called the Expert System Library Data Language. The functions are specific to operating environments, but operate the same for the Expert System Library Data Language. The operating environments where the functions reside could include Microsoft® Windows®, Microsoft® CE, Unix, Linux, handheld operating systems, cell phone operating systems as well as others. The function portability allows the present invention to be implemented across many different platforms.

Since the functions are created in the specific operating system environment, the functions are able to reach into the operating system environments to retrieve specific and detailed data. Examples of such functions include, but are not limited to: Read Windows Registry Value, Check Device Error Counter Values, Check File System Organizations and Structures, Check File Modules and File Version Values, Check for Installation of Specific Applications, Read Environmental Values and Counters, Read Windows Event Log Entries as well as other functions to retrieve specific data.

Figure 5:
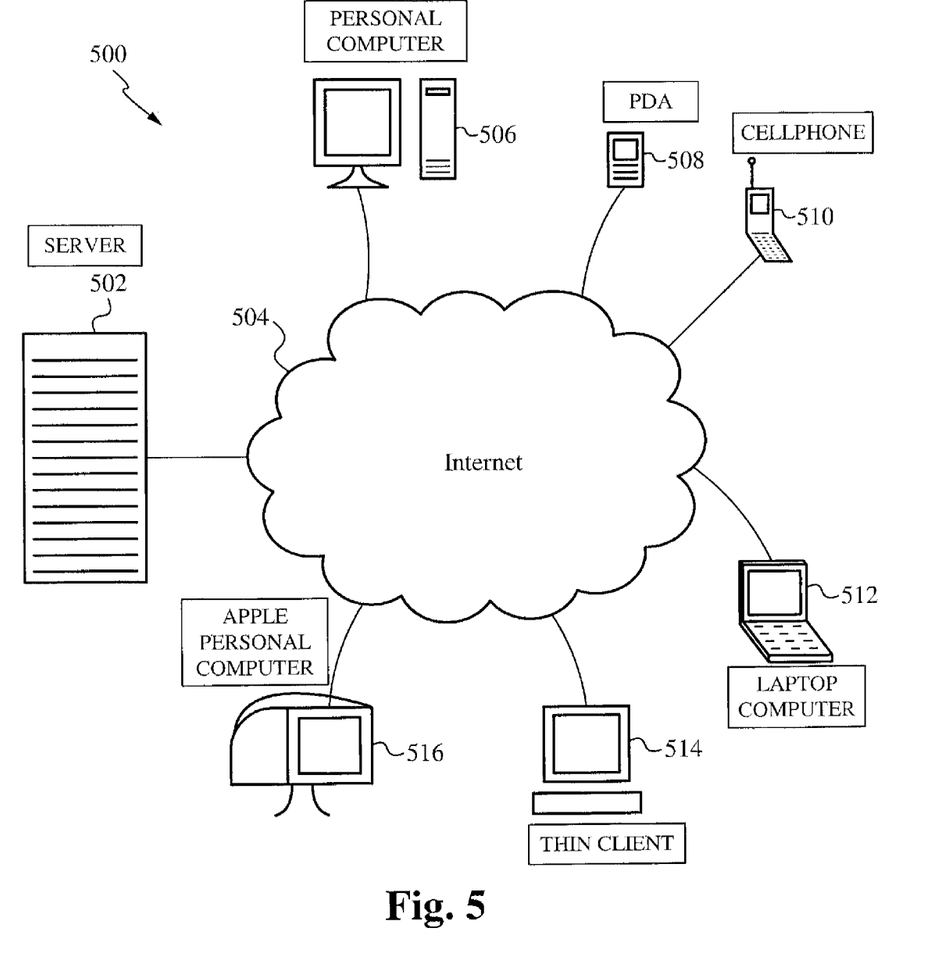
FIG. 5 illustrates a network implementing the preferred embodiment of the present invention.

FIG. 5 illustrates a network implementing the preferred embodiment of the present invention. The present invention is implemented over a network of devices 500. The expert system library is stored on a server 502 that is coupled to the Internet 504 in a preferred embodiment. In alternative embodiments, the server 502 is coupled to a company intranet or other types of networks such as a Local Area Network (LAN), Wide Area Network (WAN) or a Metropolitan Area Network (MAN). In yet other alternative embodiments, the expert system library is stored on one or more servers. Furthermore, the coupling between the server 502 and the Internet 504 is able to be via networking cables or wireless means. The Internet 504 is also coupled to a variety of computing devices that have the agent application stored on them. The computing devices include, but are not limited to, a personal computer 506, a PDA 508, a cell phone 510, a laptop computer 512, a thin client 514 or an Apple personal computer 516. The agent application retrieves problem data from the expert system library on the server 502. Then, the agent application on the computing devices checks to determine if there are any problems in the system. If any problems are discovered, the agent application alerts the user and/or attempts to remediate the issue using a script. If an unknown problem occurs without being detected, the reporting mechanism sends feedback to the server 502, so that the expert system library is able to learn of the issue and is able to detect such a conflict in the future. Thus, users of the system are able to feel comfortable they are working on a safe and secure environment and when there are undiscovered issues, with a large network of people, these undiscovered issues will be noticed and recorded so that other users' systems are able to resolve such issues.

Figure 6:
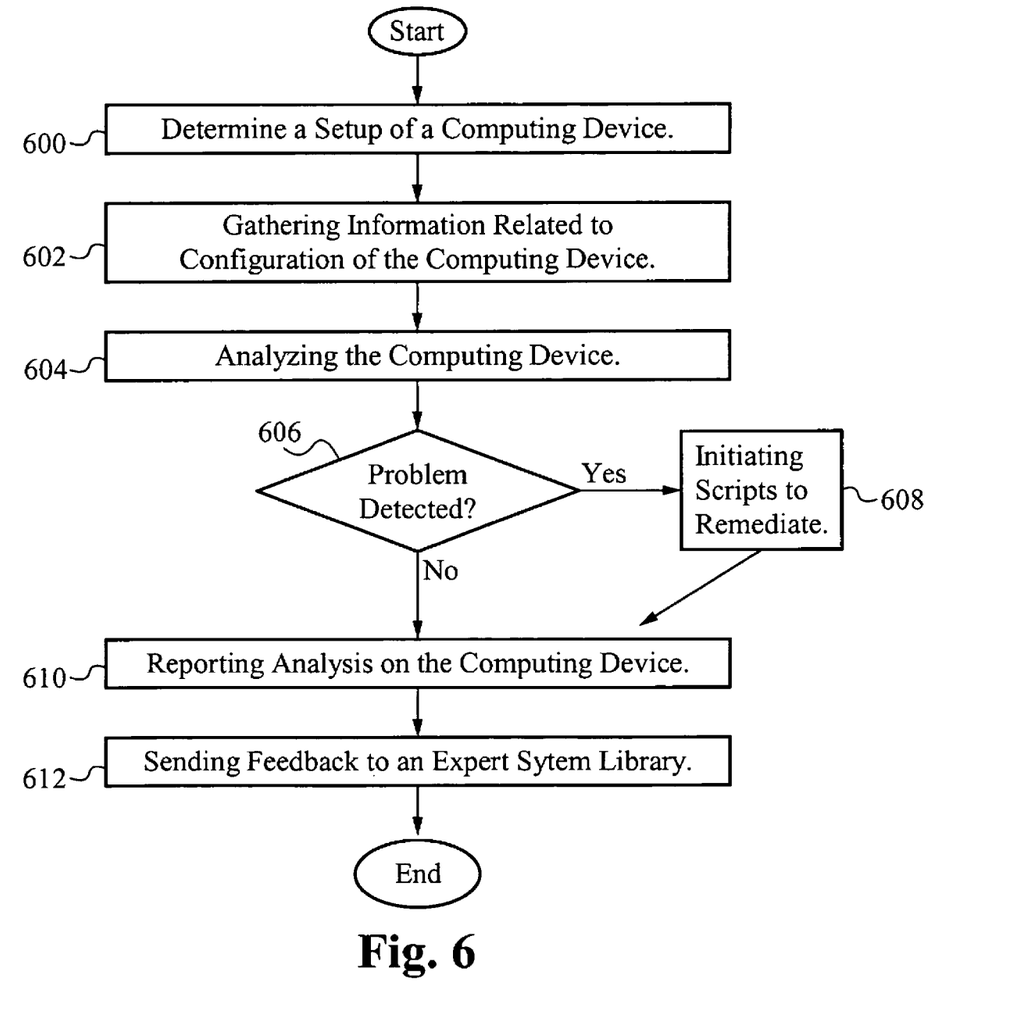
FIG. 6 illustrates a flowchart of utilizing the present invention to maintain a stable computing device.

FIG. 6 illustrates a flowchart of utilizing the present invention to maintain a stable computing device. In the step 600, a setup of the computing device is determined by the plurality of discrete programs. Setup information includes operating system information and hardware of the computing device. Then the discrete programs gather information related to configuration of the computing device, such as software installations, hardware connections and other configuration information in the step 602. Using the gathered information, the discrete programs are then able to analyze the computing device in the step 604. When analyzing the computing device the discrete programs monitor the system to make sure proper patches are installed, no software conflicts exist, the environment is stable and other necessary components are reviewed. If a problem is detected in the step 606, appropriate scripts are initiated to remediate the problem in the step 608. After the problem is remediated or if there is no problem, in some embodiments, the analysis performed by the discrete programs is reported on the computing device in the step 610. The reporting allows a user to review the status of the computing device and if any problems were discovered and how they were remediated. Also, in some embodiments, if a problem is discovered but is not able to be remediated, then feedback is sent to an expert system library in the step 612, so that in the future, such issues are known and the appropriate action is able to be taken if these issues occur again. The process continuously repeats in the background of the computing device, so that the system is able to remain stable. It should be understood that only those components that are needed are utilized again. For example, if there is no modification to the computing device setup, that information is not reacquired nor is the configuration information if the configuration has not changed. Thus, the present invention is able to monitor the system thoroughly yet efficiently.

The present invention supports subscription licenses, so that when the subscription is void or expired, the desktop software will be disabled and inactive. With respect to subscriptions, the present invention has interfaces for billing support.

An additional feature of the present invention includes offline operation. The software has the ability to run disconnected form the central server and network. The drawback with offline operation is that a user must install some if not all of the expert system library, so that it is able to be utilized locally. Furthermore, if an issue arises, the feedback mechanism is not able to communicate with the expert system library, thus the expert system library will be limited in its growth capabilities.

To utilize the present invention, in the preferred embodiment, an end user computer has the agent application pre-installed. In an alternative embodiment, a user has to install the agent application after either downloading it or via CD. Once the agent application exists on the user's computer, it interrogates the user system for the basic environment. The agent application then retrieves problem data from the expert system library pertinent to the user's operating environment. The agent application tests the user's system for each problem description within the downloaded data structure from the expert system library. If a problem is discovered, then a script will attempt to remediate the problem and/or a notification will be sent to the user describing the issue such as "patch X is missing, go to www.findpatch.com to download and install the patch." If a problem unknown to the expert system library arises, a feedback mechanism sends a notification to the expert system library that a problem was discovered. In the preferred embodiment the feedback is automatically sent via software. In an alternative embodiment, the feedback is sent via a user reporting the problem. The feedback is then utilized by the expert system library to increase the total knowledge. Then when another user with a similar or the same setup is tested, the agent application will recognize the issue and will take the appropriate actions to handle it. In time, the number of problems able to be detected and resolved will increase, thus creating a more secure and stable environment.

In operation, the present invention assists users in detecting potential problems and conflicts that a typical user is unaware of. Other programs attempt to detect specific problems, but they are insufficient to ensure an overall stable environment. The present invention not only checks for software conflicts; it also checks for conflicts within the operating system for hardware conflicts as well. When a conflict or problem does arise, the present invention utilizes scripts to attempt to resolve the problem and further reports these conflicts to the user. Furthermore, the agent application which monitors a user's computer is coupled to a feedback mechanism which is able to send data to the expert system library so that the expert system library is able to learn and expand to handle new potential conflicts. Since the expert system library is continuously expanding with new knowledge, once a new problem is discovered, the agent application is able to aid future users to resolve the problem. Ultimately, the present invention could potentially continue to gain knowledge to the point where most, if not all, conflicts and problems have been discovered and will be resolvable before any detriment comes to the user's system.

Within the present application, software includes programs, applications, scripts, system software, middleware in addition to any other generally known meaning of software.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A system for monitoring a computing device comprising:
   a. a server device in communication with the computing device, the server device including a memory device containing an expert system library;
   b. a plurality of programs stored on the computing device for interacting with the computing device to gather information;
   c. a plurality of scripts coupled to the plurality of programs for initiating the plurality of programs, wherein the plurality of scripts are stored within the expert system library, wherein the system runs in the background of the computing device; and
   d. a feedback mechanism stored on the computing device for sending feedback to the expert system library, wherein the feedback mechanism expands the expert system library, wherein the expert system library comprises a plug-in architecture, wherein the plug-in architecture comprises a plurality of entries, wherein each entry comprises a program that is functionally discrete from the program of other entries, wherein the expert system library comprises a dependency, a confidence and a health index.

2. The system as claimed in claim 1 wherein interacting with the computing device further comprises:
   a. determining a setup of the computing device;
   b. gathering information related to configuration of the computing device; and
   c. analyzing the computing device.

3. The system as claimed in claim 2 wherein gathering information includes discovering one or more problems.

4. The system as claimed in claim 1 wherein the plurality of scripts are less complex than the plurality of programs.

5. The system as claimed in claim 1 wherein the plurality of scripts return a condition status.

6. The system as claimed in claim 5 wherein the condition status is a binary-type value.

7. The system as claimed in claim 1 wherein the plurality of scripts run in a specified order.

8. The system as claimed in claim 1 further comprising a user interface coupled to the plurality of scripts for interacting with a user.

9. The system as claimed in claim 1 further comprising a reporting mechanism to report one or more problems.

10. The system as claimed in claim 1 wherein the plurality of scripts are embedded within an extensible markup language (XML) structure.

11. The system as claimed in claim 1 wherein the computing device is selected from a group consisting of a personal computer, an Apple computer, a thin client, a laptop, a cell phone and a PDA.

12. The system of claim 1, wherein the plug-in architecture of the expert system library allows a plurality of authors to independently and simultaneous modify one or more of the entries.

13. The system of claim 1, wherein the expert system library comprises a data structure including one or more of Boolean logic, string manipulation, flow control verbs and simple match functions.

14. A system for monitoring a computing device while running in the background of the computing device comprising:
   a. a server device in communication with the computing device, the server device including a memory device containing an expert system library;
   b. a plurality of programs stored on the computing device for
      i. determining a setup of the computing device;
      ii. gathering information related to configuration of the computing device; and
      iii. analyzing the computing device for one or more problems;
   c. a user interface stored on the computing device coupled to the plurality of programs, the user interface for interacting with a user;
   d. a plurality of scripts coupled to the plurality of programs and to the user interface for acting as an intermediary between the plurality of programs and the user interface, wherein each of the plurality of scripts return a condition status, wherein the plurality of scripts are stored within the expert system library, wherein the system runs in the background of the computing device; and
   e. a feedback mechanism stored on the computing device for sending feedback to the expert system library, wherein the feedback mechanism expands the expert system library;
   wherein the expert system library comprises a plug-in architecture, wherein the plug-in architecture comprises a plurality of entries, wherein each entry comprises a program that is functionally discrete from the program of other entries, wherein the expert system library comprises a dependency, a confidence and a health index.

15. The system as claimed in claim 14 wherein the condition status is a binary-type value.

16. The system as claimed in claim 14 wherein the plurality of scripts are less complex than the plurality of programs.

17. The system as claimed in claim 14 wherein the plurality of scripts run in a specified order.

18. The system as claimed in claim 14 further comprising a reporting mechanism to report the one or more problems.

19. The system as claimed in claim 14 wherein the plurality of scripts are embedded within an extensible markup language (XML) structure.

20. The system as claimed in claim 14 wherein the computing device is selected from a group consisting of a personal computer, an Apple computer, a thin client, a laptop, a cell phone and a PDA.

21. A method of monitoring a computing device to gather information comprising:
   a. providing a server device in communication with the computing device, the server device including a memory device containing an expert system library;
   b. determining a setup of the computing device;
   c. gathering information related to configuration of the computing device;
   d. analyzing the computing device;
   e. sending feedback to the expert system library; and
   f. expanding the expert system library using a feedback mechanism stored on the computing device;
   wherein the method of monitoring is performed while running in the background of the computing device, and further wherein the expert system library comprises a plug-in architecture, wherein the plug-in architecture comprises a plurality of entries, wherein each entry comprises a program that is functionally discrete from the program of other entries, wherein the expert system library comprises a dependency, a confidence and a health index.

22. The method as claimed in claim 21 wherein analyzing the computing device further comprises querying the computing device for one or more problems.

23. The method as claimed in claim 21 further comprising initiating one or more remediation scripts if one or more problems are detected.

24. The method as claimed in claim 21 further comprising reporting one or more problems.

25. The method as claimed in claim 21 wherein the computing device is selected from a group consisting of a personal computer, an Apple computer, a thin client, a laptop, a cell phone and a PDA.

26. A method of monitoring a computing device to gather information comprising:
   a. providing a server device in communication with the computing device, the server device including a memory device containing an expert system library;
   b. determining a setup of the computing device;
   c. gathering information related to configuration of the computing device;
   d. analyzing the computing device;
   e. reporting analysis on the computing device;
   f. sending feedback to the expert system library; and
   g. expanding the expert system library using a feedback mechanism stored on the computing device;
   wherein the method of monitoring is performed while running in the background of the computing device, and further wherein the expert system library comprises a plug-in architecture, wherein the plug-in architecture comprises a plurality of entries, wherein each entry comprises a program that is functionally discrete from the program of other entries, wherein the expert system library comprises a dependency, a confidence and a health index.

27. The method as claimed in claim 26 wherein analyzing the computing device further comprises querying the computing device for one or more problems.

28. The method as claimed in claim 26 further comprising initiating one or more remediation scripts if one or more problems are detected.

29. The method as claimed in claim 26 wherein the computing device is selected from a group consisting of a personal computer, an Apple computer, a thin client, a laptop, a cell phone and a PDA.

30. A method of continuously monitoring a computing device to gather information comprising:
   a. providing a server device in communication with the computing device, the server device including a memory device containing an expert system library;
   b. determining a setup of the computing device;
   c. gathering information related to configuration of the computing device;

d. querying the computing device for one or more problems wherein a broadest issue is queried first and the query is narrowed until a specific component that is causing the one or more problems problem is found;
e. reporting analysis on the computing device;
f. sending feedback to the expert system library; and
g. expanding the expert system library using a feedback mechanism stored on the computing device;

wherein the method of monitoring is continuously performed during the operation of the computing device while running in the background of the computing device, and further wherein the expert system library comprises a plug-in architecture, wherein the plug-in architecture comprises a plurality of entries, wherein each entry comprises a program that is functionally discrete from the program of other entries, wherein the expert system library comprises a dependency, a confidence and a health index.

31. The method of claim 30 further comprising assigning the one or more problems a priority level.

32. The method of claim 31 further comprising assigning the one or more problems a health risk value based on a severity of future potential harm to the computing device if the one or more problems are not corrected.

* * * * *